(12) United States Patent
Lim

(10) Patent No.: US 10,308,098 B2
(45) Date of Patent: Jun. 4, 2019

(54) ELECTRIC ASSIST VEHICLE VISOR

(71) Applicant: Stephen Sophorn Lim, Desert Hot Springs, CA (US)

(72) Inventor: Stephen Sophorn Lim, Desert Hot Springs, CA (US)

( * ) Notice: Subject to any disclaimer, the term of this patent is extended or adjusted under 35 U.S.C. 154(b) by 0 days.

(21) Appl. No.: 15/806,017

(22) Filed: Nov. 7, 2017

(65) Prior Publication Data
US 2019/0135090 A1    May 9, 2019

(51) Int. Cl.
*B60J 3/02*    (2006.01)

(52) U.S. Cl.
CPC ........... *B60J 3/0265* (2013.01); *B60J 3/0208* (2013.01)

(58) Field of Classification Search
CPC ........ B60J 3/0265; B60J 3/0208; B60J 3/023; B60J 3/0239; B60J 3/0204
USPC ................. 296/97.4, 97.6, 97.8, 97.11, 97.13
See application file for complete search history.

(56) References Cited

U.S. PATENT DOCUMENTS

| | | | |
|---|---|---|---|
| 3,825,296 A * | 7/1974 | Peterson ................ | B60J 3/0208 16/224 |
| 4,762,359 A * | 8/1988 | Boerema ................ | B60J 3/0208 296/97.11 |
| 4,921,300 A * | 5/1990 | Lawassani ............. | B60J 3/0217 296/97.11 |
| 5,071,186 A * | 12/1991 | Hemmeke .............. | B60J 3/0208 296/97.11 |
| 5,104,174 A * | 4/1992 | Gute ...................... | B60J 3/0208 296/97.4 |
| 5,192,110 A * | 3/1993 | Mykytiuk ................ | B60J 3/02 160/370.21 |
| 5,350,212 A * | 9/1994 | Corn ...................... | B60J 3/0208 296/97.11 |
| 5,417,466 A * | 5/1995 | Giantonio .............. | B60J 3/0208 296/97.6 |

(Continued)

*Primary Examiner* — Gregory A Blankenship

(57) ABSTRACT

A motor vehicle visors that can be manually operated derives an option for an electric power assistance by method of motor, with motion delivery system and a control panel with a switch, comprises of the main visor panel with an extendable visor end; a motor, and mount bevel gear system affixed the main visor panels at about the windshield, door, and roof area of the vehicle, is optioned to pivot towards the driver or passenger side window draws shorter in length and pitches towards the roof when operated, as illustrated in FIGS. 12, 12A, 12C, 12D, and 12E, is optioned to pitch normal from the driver or passenger's views and toward as illustrated in FIG. 12A. With motor and motion delivery system within the main visor panel, options to slide the entire visor normal from the roof affixed mount to pursue longer extensions of shielding strong sunlight rays along the window of the door as illustrated in FIG. 1 or 13. A secondary visor panel, independent of the main visor, is manually operational, comprises of a motor and motion delivery system, derives a pitch motion position towards the windshield and back when essential, assist in shielding strong sunlight rays when the main visor panel is positioned at the side window as illustrated in FIG. 12F. At resting or forward pitching position of the main visors, there contain a magnet mount on the roof edge of windshield for suspension support of the main visor as illustrated in FIGS. 12 and 12A.

4 Claims, 6 Drawing Sheets

(56) References Cited

U.S. PATENT DOCUMENTS

| | | | | |
|---|---|---|---|---|
| 5,580,117 | A * | 12/1996 | Goclowski | B60J 3/0208 296/97.13 |
| 5,902,002 | A * | 5/1999 | Wilson | B60J 3/0208 296/97.13 |
| 6,170,899 | B1 * | 1/2001 | Corn | B60J 3/0208 296/97.11 |
| 6,189,947 | B1 * | 2/2001 | Annan | B60J 3/0208 296/97.11 |
| 9,333,836 | B2 * | 5/2016 | Blankson | B60J 3/0208 |
| 9,493,055 | B1 * | 11/2016 | Murat | B60J 3/0208 |
| 2005/0046223 | A1 * | 3/2005 | Virts | B60J 3/0208 296/97.6 |
| 2009/0152891 | A1 * | 6/2009 | Lee | B60J 3/0208 296/97.4 |
| 2009/0250964 | A1 * | 10/2009 | Demma | B60J 3/02 296/97.2 |
| 2010/0201149 | A1 * | 8/2010 | Frotz | B60J 3/0208 296/97.4 |
| 2012/0146357 | A1 * | 6/2012 | Huang | B60J 3/0208 296/97.6 |
| 2015/0197138 | A1 * | 7/2015 | Kuenzel | B60J 3/0208 296/97.6 |
| 2016/0075218 | A1 * | 3/2016 | Frownfelter | B60J 3/0204 296/97.4 |
| 2017/0021703 | A1 * | 1/2017 | Szentkiralyi | B60J 3/0208 |

* cited by examiner

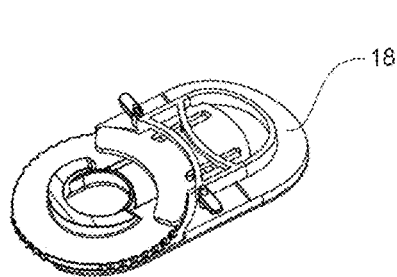
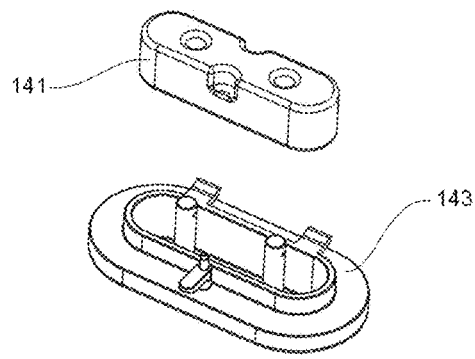
FIGURE 9　　　　　　　　　FIGURE 10
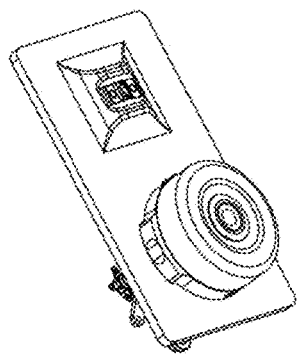
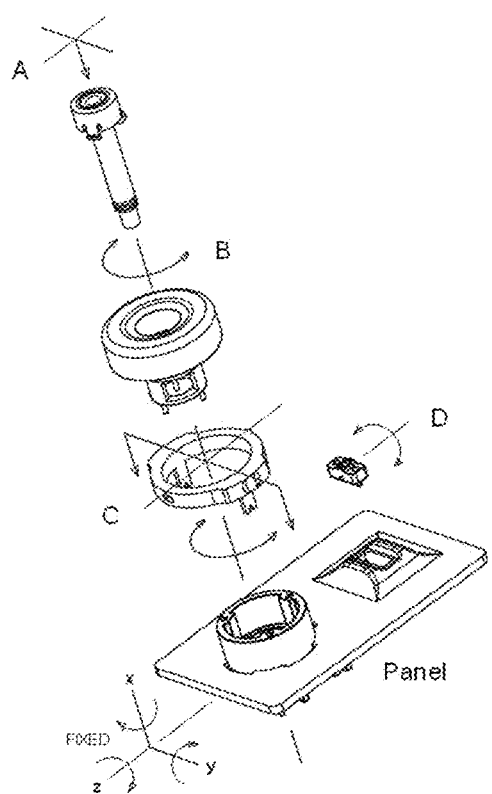
FIGURE 11　　　　　　　　　FIGURE 11A

ELECTRIC ASSIST VEHICLE VISOR

CROSS-REFERENCE TO RELATED APPLICATION

Federally Sponsored Research

Not Applicable

Sequence Listing or Program

Not Applicable

BACKGROUND OF THE INVENTION

Field of Invention

The pursuant of this invention is to develop a vehicle visor that implements electric motors to position the visor for shielding strong sunlight rays, with an option to implement the already manual operation approached by moving the sun visors with a hand when operating a motor vehicle. With a power switch to select either the driver or passenger side button and control panel to position the visors, the electric powered visor to be called the Electric Assist Vehicle Visor can assist driver or passenger in maneuvering the visors to desired position, where the center position of the switch situate the electric assistance to off mode.

Description of Prior Invention

A sun visor is said to assist a driver and/or passenger with shielding strong sunlight rays when operating an automobile or motor vehicle. There exist some patented electric operated visors like U.S. Pat. No. 5,076,633 of Hsu et al, "Automatic Sun Screen For Motor Vehicles" and U.S. Pat. No. 5,947,544 of Hubeshi "Electromechanical Sun Visor For Motor Vehicle Window", where an electric motor assist for drawing or retracting the sunlight shield or screen-like mechanism when approached; but there are some inconveniences with these glide-out sun visors attentions to one planar coverage view per motorized system; contrary to the improved Electric Assist Vehicle Visor, the improved invention, EAVV provides a wide array of visor positions for blocking the strong sunlight rays for both the windshield and side windows with a control or manual panel operation as one system panel for the main visor.

Objects and Advantages

The Electric Assist Vehicle Visor consists of two systems, the main visor and the center visor, both motorized to function by a control panel. The main visor is constructed to truncate and pitch towards the roof when pivoting to the side of the window of the vehicle, later pitches back, to parallel with the side window, then awaits for further operation from the control panel. The main visor is comprised of the Main Frame [100] and Extending Frame [150] covered with the Main Frame Shell Cover [105] and the Extending Frame Shell Cover [129] with parts and components associated within the shell covers, discussed in the Detailed Description of the Invention section. The truncation of the main visor is due to two visors constructed with the Main Frame Shell Cover [105] fitted within the Extending Frame Shell Cover [129]; fitted within the shells are the Main Frame [100] and the Extending Frame [120] for sliding feature towards the Main Frame [100] side as well as lengthen extension feature, as illustrated in FIGS. 1 and 2. Additional support of the main visor at front pitches and resting position is suspended by method of a Magnet [141] and Magnet Cover [143] affixed at the top of the roof, next to the center visor along the edge of the roof and windshield of the vehicle, where the Metal Drum [140] is placed at corner the Extending Frame [120] section of the main visor for magnetic interaction.

The center visor is identified as the Front Visor [150], an electric assisted visor independent of the main visor; as function to pitch forward, normal from the driver or passenger frontal view, when the main visor is positioned at the side window position illustrated in FIG. 12F. The one pitch motion of the Front Visor [150] mechanical structure consists of the motor mount and belt unit system for motor utilization, with manual operation, detail illustration in FIG. 8.

SUMMARY OF THE INVENTION

The advancement in automobile has lead to many electric power assisted features on vehicles, like the sliding door on a mini-van which slides automatically when the handle is open or a button is pushed, the rear trunk of a vehicle functions when triggered with a hand/feet motion and/or such activation methods, and the side mirrors where one method folds inward when the vehicle engine disengages, and many more convenience feature. This invention for the Electric Assist Vehicle Visor delivers another great feature to the automobile, where the visor allows for an easy to reach feature for the driver and/or passenger; with the electronic assist capabilities allows for the front visor panel to pitch forward, backward, and pivots to side window of the driver or passenger.

The Electric Assist Vehicle Visor comprises of the main visor and the center visor; where the two visor systems can be place at the driver side and/or passenger side of the vehicle. The main visor is constructed to truncate and pitch towards the roof, for pitching to the side window; where the Main Frame [100] construction allows the Extending Frame [150] to slide for short length and extend for longer length of the visor. The main visor is affixed inside the vehicle to the roof, door, and windshield edge corner with a magnet to support the suspension at the other end of the main visor when at the rest or pitch displacement position. The center visor is another motorized system that is independent of the main visor, placed center of the driver or passenger; its function is to pitch forward and towards the driver or passenger when the main visor is at the side window.

BRIEF DESCRIPTION OF THE DRAWINGS

In the drawings, figures in some views are composed with the same reference numbers and in different assembly views for better illustrations.

FIG. 9 shows a detailed image of the bevel mount unit cover for final assembly for the electric assist vehicle visor.

FIG. 10 shows a detailed image of the magnet and magnet cover for the electric assist vehicle visor.

FIG. 11 shows the controller by manual hand and finger operation for the electric assist vehicle visor.

FIG. 11A shows the controller function directions in exploded view for the electric assist vehicle visor.

FIG. 12F shows the main visor of the electric assist vehicle visor, pivot along the side window, translates at regular position, and at maximum extension normal at the bevel mount unit along the side window; shows the front panel visor pitch towards the windshield.

DRAWINGS—REFERENCE NUMERALS

| | | | |
|---|---|---|---|
| 10 | Bevel Motor Mount Unit | 11 | Pinion |
| 12 | Bevel Gear | 13 | Pivot Insert Ring |
| 14 | Motor | 15 | Pivot Lock Nut |
| 16 | Bevel Motor Mount Bracket | 18 | Bevel Mount Cover |
| 20 | Primary Glider Rod | 22 | Primary Insert Ring |
| 24 | Primary Wire Port | | |
| 30 | Translation Glider Bracket | 32 | Primary Rod Belt Grip |
| 34 | Main Frame Rubber Cushion | 36 | Motor Mount Cushion |
| 38 | Motor Mount Bracket | | |
| 40 | Secondary Glider Rod | 42 | Secondary Insert Ring |
| 50 | Primary Pivot Mount | 52 | Pivot Roller Support |
| 60 | Primary Support Rod | | |
| 100 | Main Frame | 101 | Primary Glider Rod Insert |
| 102 | Secondary Glider Rod Insert | 103 | Extending Support Rod Insert |
| 104 | Extending Glider Rod Insert | 105 | Main Frame Shell Cover |
| 110 | Wiring Duct | 111 | Motor L-Bracket |
| 112 | Extending Frame Cushion | 113 | Motor Bracket |
| 114 | Wire Path | 116 | Motor Harness |
| 118 | Pulley Gear Bracket | | |
| 120 | Extending Frame | 122 | Extending Rod Belt Grip |
| 124 | Extending Rod Coupler | 126 | Extending Glider Rod |
| 127 | Extending Frame Shell Cover Round Corner | 128 | Extending Support Rod |
| 129 | Extending Frame Shell Cover | | |
| 130 | Retractable Wire Harness | 132 | Pulley Gear |
| 134 | Drive Pulley Gear | 136 | Rod Pulley Gear |
| 140 | Metal Drum | 141 | Magnet |
| 142 | Pitch Belt | 143 | Magnet Cover |
| 144 | Primary Translation Belt | 146 | Secondary Translation Belt |
| 150 | Front Visor | 152 | Front Insert Rod |
| 154 | Front Mount Cover | 156 | Front Motor Bracket |
| 158 | Front Belt | 160 | Front Visor Mount |
| A | Push Button | B | Turn Knob |
| C | Push Turn Knob | D | Driver/Off/Passenger Switch |

DETAILED DESCRIPTION OF THE INVENTION

FIG. 1—Embodiment

Figure 1:
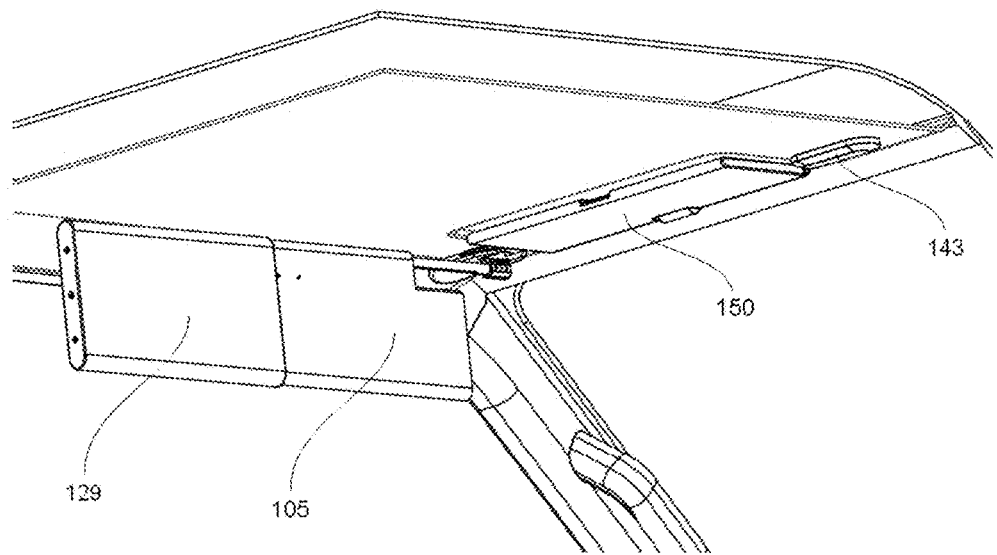
FIG. 1 shows a three-dimensional drawing of the electric assist vehicle visor panels and feature applications.

A preferred embodiment of like structure of the EAVV invention in FIG. 1 (three-dimensional view) derives an electric assist vehicle visor products, consists of the main panel, Main Frame Shell Cover [105] attached with Extending Frame Shell Cover [129] mounts to corner roof of the vehicle; the Front Visor [150] mounts center to the driver's side with the Magnet [141] and Magnet Cover [143] mount next along the roof and windshield edges.

FIG. 2—Embodiment

Figure 2:
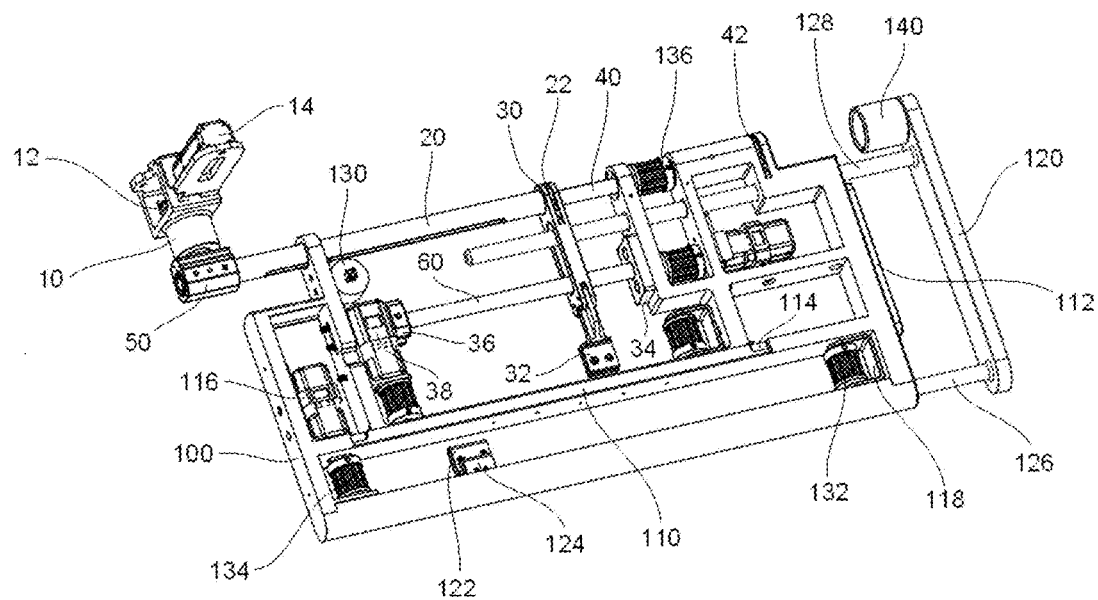
FIG. 2 shows internal mechanical and electronic components structure for the electric assist vehicle visor panels.

An embodiment of like structure of the EAVV invention as shown in FIG. 2 are assembled to contain the Bevel Motor Mount [10], houses the Bevel Gear [12] and Bevel Motor [14], inserted normal within the Bevel Motor Mount [10] tube is the Primary Pivot Mount [50], which houses the Primary Glider Rod [20]; along the Primary Glider Rod [20]

inserts the Main Frame [100] and Translation Glider Bracket [30], which locks in position the Primary Insert Ring [22]; inserted within the Translation Glider Bracket [30] contains the Secondary Glider Rod [40] supported with the mid hole inserts of the Main Frame [100], there harness the Rod Pulley Gear[136], with the Secondary Insert Ring [42] locking the corner insert of the Main Frame [100] translation assembly.

At the first insert hole of the Main Frame [100], below the Primary Glider Rod [20], mounts the Retractable Wire Harness [130], where next below, mounts the Motor Mount Bracket [38] with the Primary Support Rod [60] passing through the Translation Glider Bracket [30] as the Primary Rod Belt Grip [32] attaches, there thread to the mid hole inserts elbow of the Main Frame [100], with the Main Frame Rubber Cushion [34] and Motor Mount Cushion [36] to allow dampening for the Translation Glider Bracket [30] to absorb.

Normal to the Motor Mount Bracket [38], at the Primary Pivot Mount [50] side of the Main Frame [100], houses the Motor Bracket [116] for the motor unit with the Drive Pulley Gear [134] system for the Extending Frame [120], which comprises of the Extending Glider Rod [126] attaches the rod drive end with the Extending Rod Belt Grip [122] and Extending Rod Coupler [124]; the Extending Support Rod [128] allows stability for the Extending Frame [120], as the Metal Drum [140] allows for magnetic suspension to take hold when at appropriate position of the Electric Assist Vehicle Visor. The Pulley Gear [132] and Pulley Gear Bracket [118] completes the drive-train belt system for the Extending Frame [120]. The Extending Frame Cushion [112] attached at the end side of the Main Frame [100] absorbs/stops the Extending Frame [120] for smooth stop motion, where the Wire Path [114] allows for wirings to take route along the Wiring Duct [110] continues on through the Primary Glider Rod [20] and Primary Pivot Mount [50] for electrical wiring.

FIG. 3—Embodiment

Figure 3:
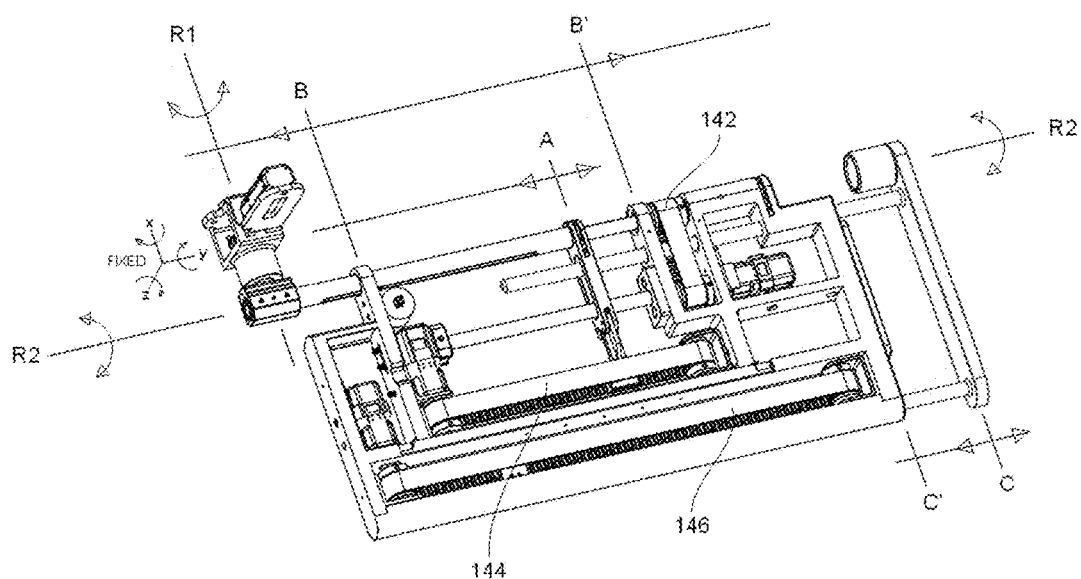
FIG. 3 shows the pitch and translation movement capabilities for the electric assist vehicle visor panels.

An embodiment of like structure of the EAVV invention in FIG. 3 derives the Pitch Belt [142] drive system consists of the Drive Pulley Gear [134] with Rod Pulley Gear [136] screw fixed to Secondary Glider Rod [40]. The Primary Translation Belt [144] drive system consist of the Drive Pulley Gear [134] and Pulley Gear [132] with the Pulley Gear Bracket [118] bolts tensioned to the Main Frame [100] body, are gripped to the Primary Rod Belt Grip [32]; as the Secondary Translation Belt [146] drive system consist of the Drive Pulley Gear [134], Extending Rod Belt Grip [122], Pulley Gear [132] and Pulley Gear Bracket [118] that is nut tensioned to the Main Frame [100].

FIG. 4—Embodiment

Figure 4:
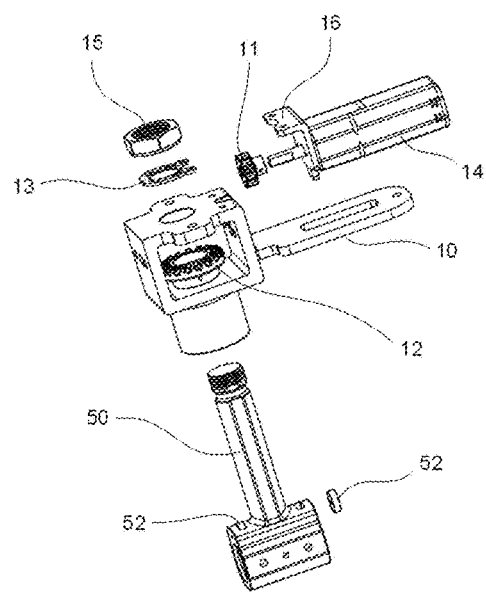
FIG. 4 shows a detailed image of the bevel mount unit components in exploded view at the R1 rotation feature for the electric assist vehicle visor panels.

An embodiment of like structure of the EAVV invention in FIG. 4 illustrates an exploded view in details, comprises of the Pinion [11] and Bevel Gear [12] placed inside the Bevel Motor Mount [10], as the Bevel Motor Mount Bracket [16] position the Motor [14] accuracy; the Primary Pivot Mount [50] with a polygon shape rod slips through Bevel Motor Mount [10], through the Bevel Gear [12] is screwed tight and held in placed with the Pivot Insert Ring [13] and Pivot Lock Nut [15] at the top surface of the Bevel Motor Mount [10]; With two Pivot Roller Support [52] wheels at the circular base of the Bevel Motor Mount [10] pursues a smooth pivot motion.

FIG. 5—Embodiment

Figure 5:
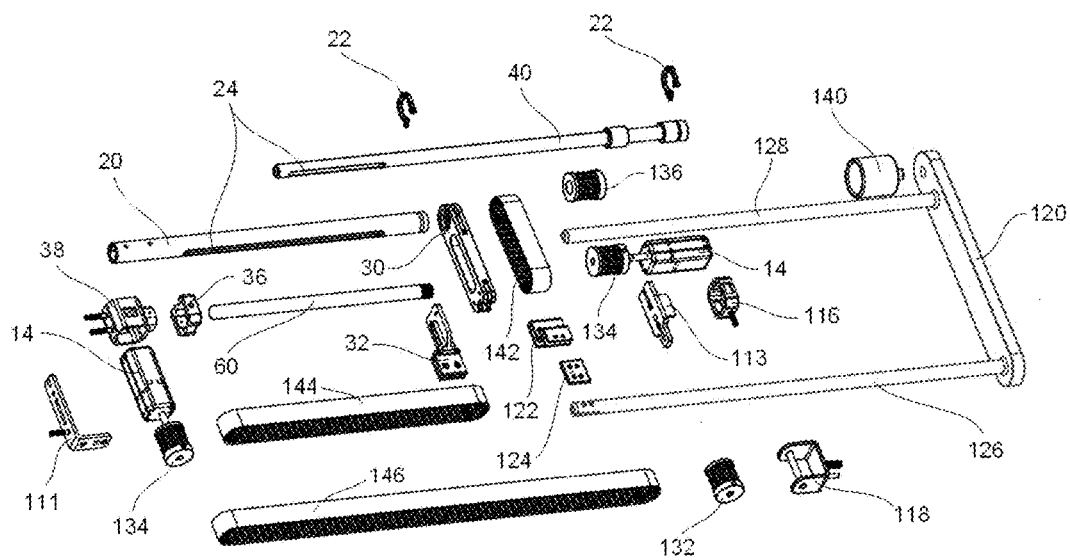
FIG. 5 shows a detailed image of components inside the electric assist vehicle visor panels in exploded views.

An embodiment of like structure of the EAVV invention in FIG. 5 illustrates an exploded view in details of the Primary Glider Rod [20] with an inside cross section, a tubular shape contains one flat side for non-twisting motion, contains the Primary Wire Port [24], a cut section for wires to pass inside the tubular shape; where the Secondary Glider Rod [40] translates inside the tubular shape of the Primary Glider Rod [20], to contain the Primary Wire Port [24] with one end to allow the Primary Insert Ring [22] to lock with the Main Frame [100]; another end of the Primary Glider Rod [20] allows for another Primary Insert Ring [22] to lock in the Translation Glider Bracket [30] for motion to glide along the Primary Support Rod [60] and the Primary Rod Belt Grip [32]. The Primary Support Rod [60] end screw fixed onto the mid hole insert elbow of the Main Frame [100] with the other end attaching to the Motor Harness [38] bolts into the Main Frame [100] securing the Motor [14] and Drive Pulley Gear [134], as the Motor Mount Cushion [36] slid securely into the Motor Harness [38], there mounts to the Main Frame [100] with the Motor L-Bracket [111] for the Primary Translation Belt [144] system. The Secondary Translation Belt [146] implements the Motor L-Bracket [111] with Motor [14] and Drive Pulley Gear [134] to the Pulley Gear [132] and Pulley Gear Bracket [118] nut tensioned to the Main Frame [100], allows for the Secondary Translation Belt [146] to grip to the Extending Rod Belt Grip [122] and Extending Rod Coupler [124], for translation drive of the Extending Glider Rod [126] and supporting of Extending Support Rod [128] to drive the Extending Frame [120] with peripheral component of the Metal Drum [140]. Details of the Pitch Belt [142] drive system, consists of the Rod Pulley Gear [136] belt drive to Drive Pulley Gear [134] and Motor [14] tensioned with the Motor Bracket [113] and Motor Harness [116].

FIG. 6—Embodiment

Figure 6:
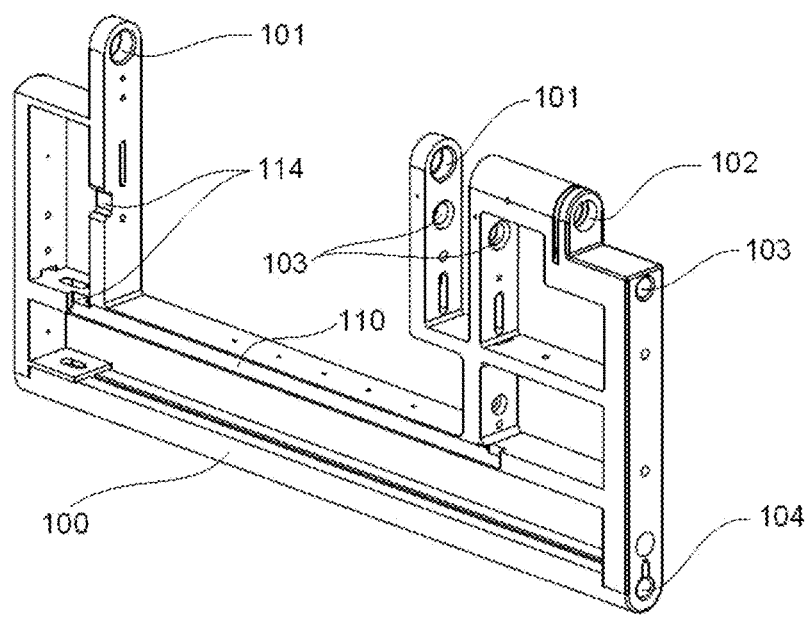
FIG. 6 shows a detailed image of the electric assist vehicle visor frame with eminent holes for components assemblies for rod gliding, grooves indentations for wiring paths, and other essentials components.

An embodiment of like structure of the EAVV invention in FIG. 6 details the Main Frame [100] with the Primary Glider Rod Insert [101], the Secondary Glider Rod Insert [102], the Extending Support Rod Insert [103], and Extending Glider Rod Insert [104] holes, with Wiring Duct [110] groove and Wire Path [114] notches for electrical wires pathway at about the Main Frame [100].

FIG. 7—Embodiment

Figure 7:
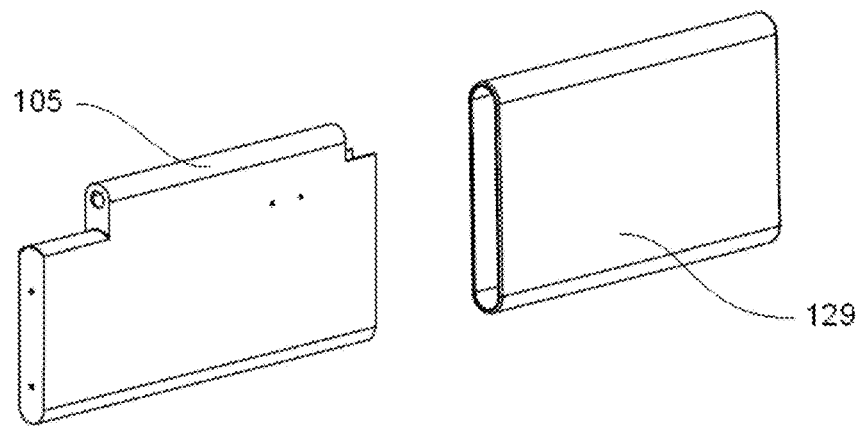
FIG. 7 shows the electric assist vehicle visor outer shell covers for the primary and secondary panels.

An embodiment of like structure of the EAVV invention in FIG. 7 displays the Main Frame Shell Cover [105] for the Main Frame [100] and the Extending Frame Shell Cover [129] for the Extending Frame [120].

FIG. 7A—Embodiment

Figure 7A:
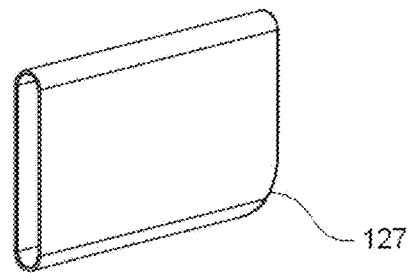
FIG. 7A shows the electric assist vehicle visor outer shell cover for the primary panel with an optional secondary shell panel with one corner rounded.

An embodiment of like structure of the EAVV invention in FIG. 7A illustrates an Extending Frame Shell Cover Round Corner [127] as an option in lieu of the Extending Frame Shell Cover [129].

FIG. 8—Embodiment

Figure 8:
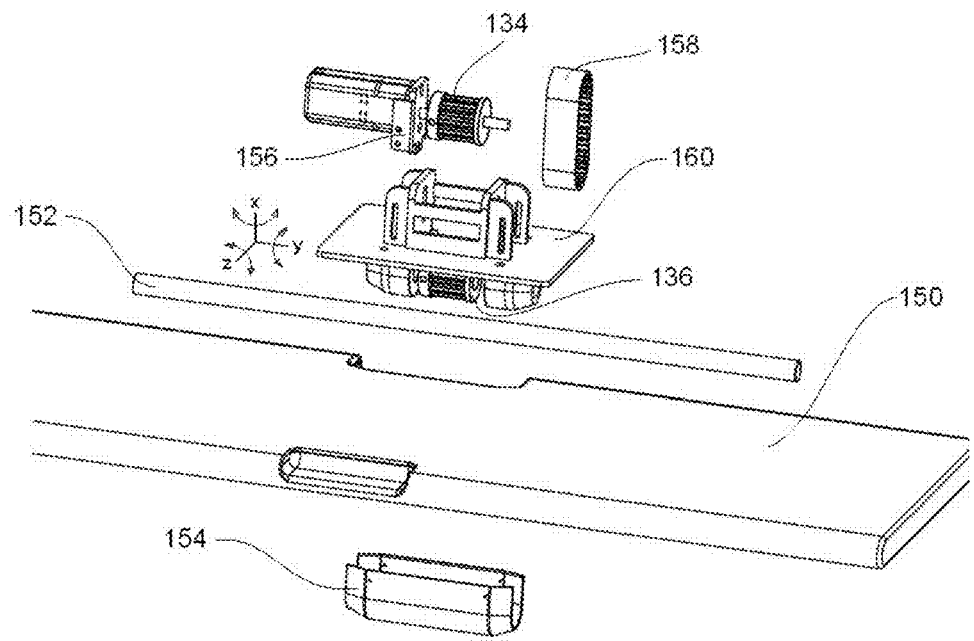
FIG. 8 shows the electric assist vehicle front visor panel with motor and components in exploded views.

An embodiment of like structure of the EAVV invention in FIG. 8 illustrates in exploded view details the Front Visor [150] with the Front Insert Rod [152] to insert into one end of the larger edges of the Front Visor [150] through to Front Visor Mount [160] unit and Rod Pulley Gear [136], as Front Belt [158] delivers motion from the Drive Pulley Gear [134] and Motor [14] with the Front Motor Bracket [156] delivers tension for smooth function, and the Front Mount Cover [154] for aesthetics.

FIG. 9—Embodiment

An embodiment of like structure of the EAVV invention in FIG. 9 details the Bevel Mount Cover [18] with three pieces assembly allow for one of the pieces to rotate when assembled to the Bevel Motor Mount Unit [10] and rotates back for maintenance and aesthetics at about the roof panel of the vehicle.

FIG. 10—Embodiment

An embodiment of like structure of the EAVV invention in FIG. 10 details a Magnet [141] and Magnet Cover [143] installed at the roof panel, next to the Front Visor [150], for suspending the EAVV main visor while at rest or pivoting position, implement approach of magnetism to the Metal Drum [140] of Extending Frame [120].

FIG. 11 to 11A—Embodiment

An embodiment of like structure of the EAVV invention in FIG. 11 derives a controller for operating the Electric Assist Vehicle Visor and FIG. 11A is an exploded view that details the motion functionalities, which comprises of the Push Button [A], Turn Knob [B], Push Turn Knob [C], and Driver/Off/Passenger Switch [D].

Figure 12:
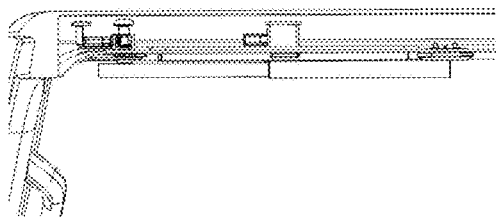
FIG. 12 shows the position of the electric assist vehicle visor at non-functional operation.

FIG. 12 to 12F—Embodiment

An embodiment of like structure of the invention in FIGS. 12 to 12F derives the motion position capabilities for the function of the Electric Assist Vehicle Visor.

FIG. 13—Embodiment

Figure 13:
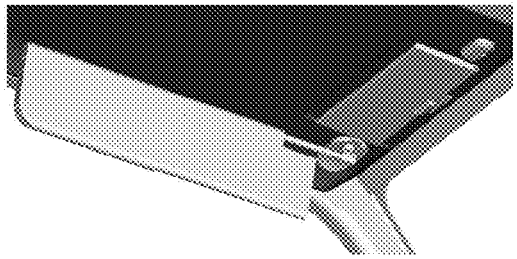
FIG. 13 illustrates the main visor of the electric assist vehicle visor complete 3D rendering in color showing the optional secondary shell cover panel with round corner at maximum extension at the side driver side window.

An embodiment of like structure of the invention in FIG. 13 derives a color image of the Electric Assist Vehicle Visor motioned at maximum extension on the driver side window implementing the Extending Frame Shell Cover Round Corner [127] panel.

OPERATIONS—FIGS. 3, 8, 11 TO 11A, 12 TO 12F, 13

The Electric Assist Vehicle Visor can be operated manually or with the controller as shown in FIG. 3 function direction in translation and in rotation displacement; in conjunctions with the control buttons and knobs in FIG. 11-11A, derives two pitch motions at R1 and R2 with two translated motions A, B and B'; there, allows for Electric Assist Vehicle Visor to pivot or pitch at R1 x-axis from the windshield position to side of the driver window using the Bevel Gear [12] and Pinion [11] bevel motor gears unit, where Bevel Motor Mount [10] is fixed to the corner roof or bracket portion of the roof of the vehicle; at R2 y-axis, from panels position parallel to the roof, pitches from rest position of the roof, towards the front windshield implements the Pitch Belt [142] that associates the Rod Pulley Gear [136], which is affixed by screw to the Secondary Glider Rod [40] to the Drive Pulley Gear [134] to Motor [14] held by Motor Bracket [113] to the Main Frame [100].

Translation A, motions within Translation B and B', which moves the entire Electric Assist Vehicle Visor along the y-axis between that limit, by method of the Translation Glider Bracket [30] held by Primary Insert Ring [22] to Primary Glider Rod [20] guided and supported by Primary Support Rod [60] allows for Translation Glider Bracket [30] attached to Primary Rod Belt Grip [32] to pass through, is gripped to the Primary Translation Belt [144], which is driven by Motor [14] with the Motor Mount Bracket [38] to the Main Frame [100] and the Drive Pulley [134] to Pulley Gear [132] held by Pulley Gear Bracket [118] tensioned to the Main Frame [100].

Translation C motion normal from C' as fixed point along the y-axis, moves Extending Frame [120] outward by method of Extending Support Rod [128] and Extending Glider Rod [126] that attaches to the Extending Rod Coupler [124] to Extending Rod Belt Grip [122] to Secondary Translation Belt [146], which is driven by Motor [14] with Motor L-Bracket [111] to the Main Frame [100] with Drive Pulley [134] to Pulley Gear [132] held by Pulley Gear Bracket [118] tensioned to the Main Frame [100].

In FIG. 8, the Front Visor [150], which the Front Visor Mount [160] mounts along the roof edge and windshield, about center of driver peripheral view; at the y-axis of rotation, from the rest position parallel to the roof, pitches from the roof towards the front windshield, where the drive force of the Front Belt [158] associates the Rod Pulley Gear [136] to the Drive Pulley Gear [134] to Motor [14] tensioned by the Front Motor Bracket [156].

In FIGS. 11 and 11A, shows the controller for the Electric Assist Vehicle Visor and control function motions, where Button A derives a motion along the x-axis inward into the y-z plane; where Button B rotates clockwise or counter clockwise at about the x-axis of rotation; where Button C motions inward into the y-z plane for rotations to clockwise or counter clockwise at about the x-axis of rotation; where Button D is the switch for the Driver Side Visor, Off, or Passenger Side visor, which rotates at about the z-axis of rotation; when motion at negative y-axis side, it controls the Driver visors; vise versa, when motion at the positive y-axis side, it allows controlling the Passenger Side Visors.

Figure 12A:
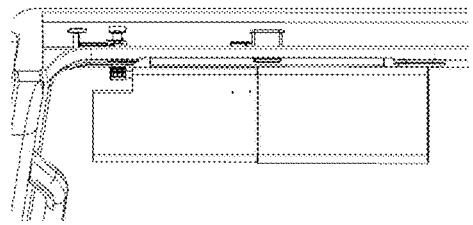
FIG. 12A shows the main visor of the electric assist vehicle visor, primary and secondary visor panels pitch normal to the driver's view.
Figure 12B:
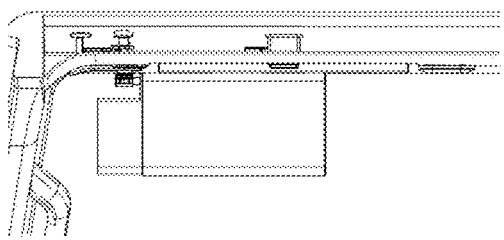
FIG. 12B shows the main visor of the electric assist vehicle visor, allows for the secondary visor panel to draw in translation towards the primary visor panel to shorten its length for the next operational feature.
Figure 12C:
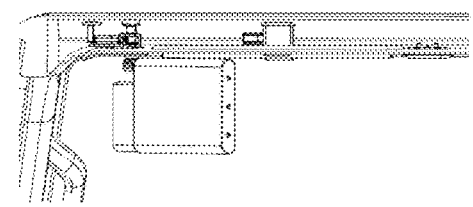
FIG. 12C shows the main visor of the electric assist vehicle visor, to pivot at the bevel mount unit normal to the window side.
Figure 12D:
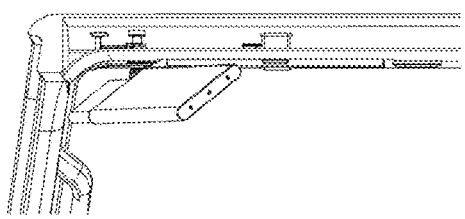
FIG. 12D shows the main visor of the electric assist vehicle visor, to pivot at the bevel mount unit normal towards the window side and pitch normal towards the roof.
Figure 12E:
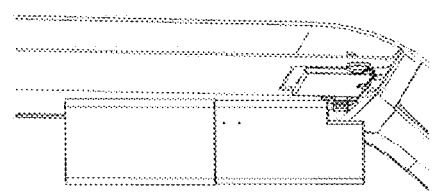
FIG. 12E shows the main visor of the electric assist vehicle visor, pivot at the bevel mount unit and pitch along the side window.
Figure 12:
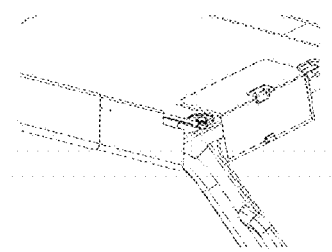

The Electric Assist Vehicle Visors in FIGS. 12 to 13 displays the operational displacement position of the visors; as FIG. 12 display the main visor and front visor at resting position. The controller device may have many programming methods to operate the visors, where the following is one method:

Where Button A is the menu or mode:
  With one push, the controller awakes from sleep mode and ready for operation;
  With push and hold at set seconds, the visors Resets or Default to resting position.
Where Knob B is the pitch, after pushing Button A from sleep mode, turning the knob pitches the main visor or center visor towards or away from the windshield as in FIG. 12A; center visor is controlled by Knob B and is functional when the main visor is at the side window as illustrated in FIG. 12F.
Where Knob C pivots the main visor to the side window,
  When push and turning the Knob C clockwise or counter clockwise pivot the main visor towards the driver side window; vise versa, at the passenger side, the main visor pivot towards the passenger side window. While the main visor is pivoting, the main visor will truncate to its shortest length, and pitches upward towards the roof of the vehicle like in the illustration of FIGS. 12B, 12C, and 12D;

Where push, turning and holding Knob C for set seconds extends the main visor to maximum length along side window as shown in FIG. 12F and FIG. 13;

When holding down the Knob C for set second, defaults the main visor to the windshield position as shown in FIG. 12A.

Where Button D is the switch for selection of the Driver, Off Button, or Passenger.

CONCLUSION

The Electric Assist Vehicle Visor invention is to improve the already existing manual operation sun visor and enhance the user convenience with an electric power operation by method of motor, motion delivery system, a controller, switch and visor panels. The EAVV system comprises of the main visor and center visor, where the main visor feature truncates and pitches towards the roof when application is for the side window; the center visor pitches towards and normal from the windshield. The main visor is additionally support with a magnet when at rest and pitching position at the windshield position. The center visor is an additional support optional for blocking strong sunlight rays when the main visor stays position at the side window.

The motion delivery system of the EAVV consists of the motor, belt and gear drive-train system but there are other translation drive systems like actuators and the screw drive system. The button and knobs are to control the displacement position of the visors and may have many programming methods or approaches. The frame and internal components of the visors shall implement strong to lightweight materials with heat resistance.

For future development, the Electric Assist Vehicle Visor can be enhanced to deliver for the driver or passenger visor system to have the option to connect to the global positioning system for the vehicle to locate the strong sunlight rays disturbing the driver's or passenger's eyes will automatically shield by method implementing artificial intelligence technology to maneuver the positioning of the visor(s) by itself. With the concept of artificial intelligence technology, implementation of the Electric Assist Vehicle Visor development approach may be further developed to contain an automatic feature to carry on the sunlight detection, by method of sensors monitoring system to the human eye(s) and sync with the location of the strong sunlight rays directing at the pupil or iris area of the eye, there maneuvers the visors to shade the strong sunlight rays.

I claim:

1. A vehicle visor system comprising:

A first visor having a first end and a second end, the first end of the first visor is mounted to a roof adjacent to a windshield and a side window, the first visor can pivot from a windshield blocking position adjacent the windshield to a side window blocking position adjacent the side window using an electric motor mounted to the roof, the second end of the first visor is releasably fixed to a magnet mounted to the roof in a stored position and the windshield blocking position, the first visor has an extending frame that slides along a glide rod using a motor to allow adjustment of a length of the first visor between a minimum length and a maximum length that is approximately twice the minimum length, the first visor collapses to the minimum length and pivots towards the roof before pivoting to the side window;

A second visor mounted adjacent the windshield, the second visor rotates from a stored position parallel to the roof to a use position generally perpendicular to the roof;

A control panel controls all motors of the vehicle visor system.

2. The vehicle visor of claim 1, wherein the second visor has a motor to move the second visor from a stored position to the use position.

3. The vehicle visor of claim 1, wherein the first and second visors can be manually operated.

4. The vehicle visor of claim 1, wherein the first and second visors automatically return to their respective stored positions when a vehicle engine in shut off.

* * * * *